(No Model.)
C. E. SCRIBNER.
TEST SYSTEM FOR MULTIPLE SWITCH BOARDS.
No. 385,205. Patented June 26, 1888.
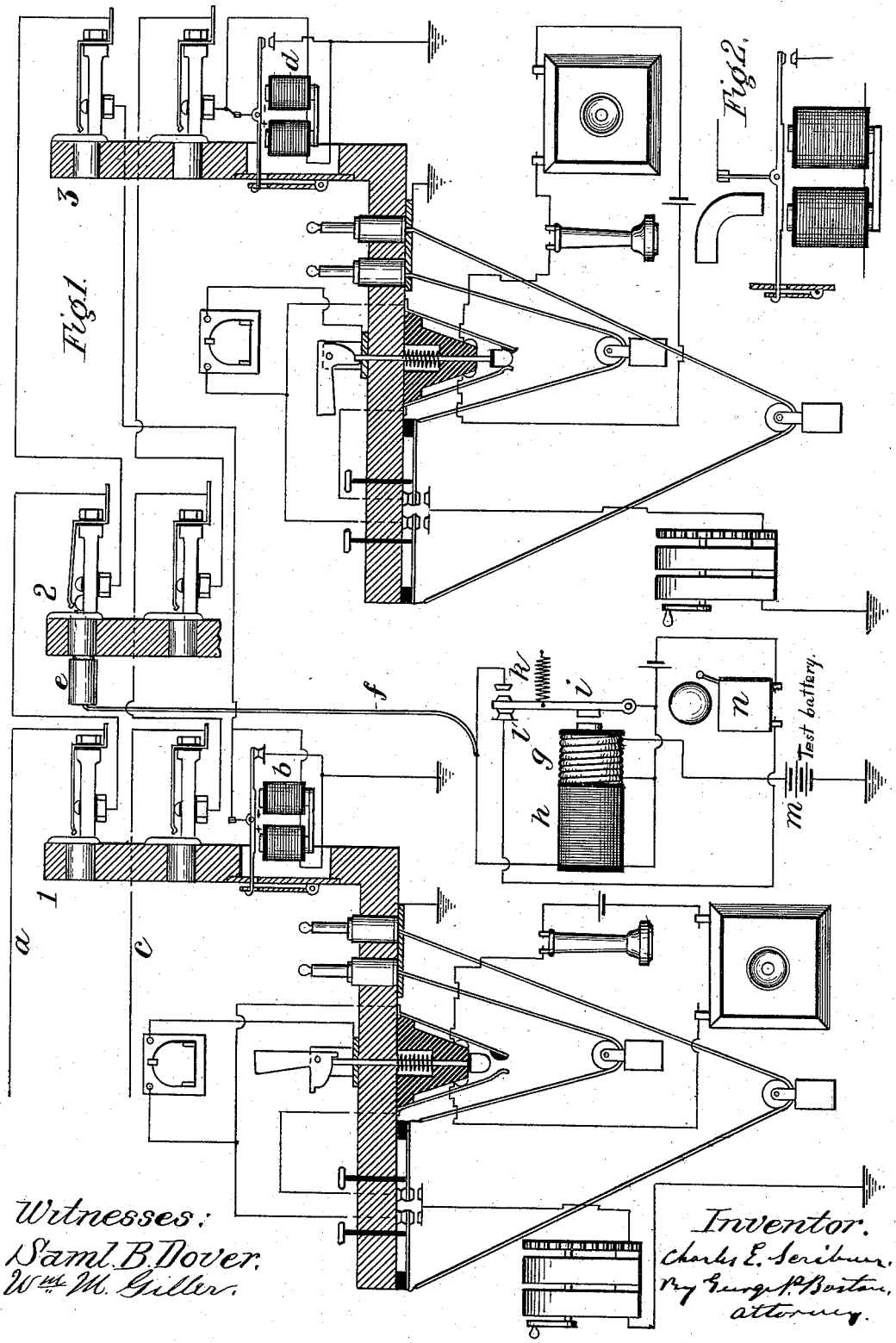
Witnesses:
Saml. B. Dover.
Wm. M. Giller.
Inventor.
Charles E. Scribner.
By George P. Boston,
attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TEST SYSTEM FOR MULTIPLE SWITCH-BOARDS.

SPECIFICATION forming part of Letters Patent No. 385,205, dated June 26, 1888.

Application filed December 27, 1886. Renewed November 21, 1887. Serial No. 255,771. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test Systems for Multiple Switch-Boards, (Case 124,) of which the following is a full, clear, concise, and exact description, reference being had to the accompanying drawings, forming a part of this specification.

In multiple switch-board systems, in order to avoid confusion, it is necessary to test each line called for before making the connection between the line of the subscriber calling and the called subscriber's line. Many different systems of testing have been heretofore devised for doing this work. One of the systems is shown in my patent for improvement in multiple switch-board systems, No. 321,390, of June 30, 1885. By the use of my invention herein I am enabled to dispense with the test-keys and the test portion of the line with said test-keys on the different boards described and claimed in said patent.

My invention consists in providing a polarized annunciator of high resistance in the circuit of each line after it has passed through its spring-jacks, and means for momentarily shunting any one of these polarized annunciators out of circuit when the test is made at the line. The testing apparatus used at each board consists of an electro-magnet provided with two windings—one of, say, half an ohm resistance, and the other winding of, say, one hundred ohms resistance—a battery of moderate size—say three or four cells—included in the circuit of said electro-magnet and switching apparatus, whereby on connecting the circuit of the electro-magnet to a line that is not in use the armature of the electro-magnet of the testing apparatus will be moved to break the shunt around the high-resistance winding of said electro-magnet when the polarized annunciator of the line is momentarily shunted out of circuit. Both windings of the electro-magnet of the testing apparatus being thus included in the circuit, its armature will be held in position to maintain the circuit through the high-resistance winding to the line if said line is closed to the subscriber's station. If, however, there is a break in the line between the spring-jack that is being tested and the subscriber's station, the circuit of the battery and electro-magnet of the testing apparatus will remain open and the armature will fall back to its normal position.

My invention may be readily understood by reference to the accompanying drawings, in which—

Figure 1 shows two telephone-lines, each connected through a different spring-jack on each of three multiple switch-boards, and from the switches on the last board through polarized annunciators to ground. Fig. 2 is a detailed view of the polarized annunciator and the ground-contact for shunting the said annunciator out of circuit.

At the first and third boards I have shown the usual key-board apparatus, and at the second board I have shown the testing apparatus which I have invented.

The circuit of line $a$ may be traced through the spring-jack switches on boards 1 2 3, and through polarized annunciator $b$ to ground. Circuit of line $c$ may be traced in like manner through a spring-jack on each of the boards and through polarized annunciator $d$ to ground.

As shown in Fig. 2, the armature of the polarized annunciator is connected with a flat spring, and when current is sent from the subscriber's generator in reversals the armature of the polarized annunciator will vibrate and allow the shutter to fall. When, however, current is sent from any test-battery through any polarized annunciator, the annunciator is so set that its armature will be simply moved down against the ground contact-point, thus shunting out the coils of the said polarized annunciator without throwing down the shutter.

The testing apparatus may consist of the plug $e$, the cord $f$, connected therewith, the electro-magnet provided with low-resistance winding $g$ and high-resistance winding $h$, the armature $i$ of said electro-magnet, connections $k$ $l$, and the test-battery $m$. I preferably provide, also, a vibrating bell, $n$, in a local circuit, as shown. The winding $g$ is of such low resistance that current from battery $m$, when sent to line or through any considerable resistance, will not be sufficient to magnetize the electro-magnet sufficiently to attract its armature. If, however, current is sent from battery $m$ through said winding directly to ground, the electro-magnet will be strong enough to draw its armature $i$ toward its poles. We will suppose now that the line $a$ is connected with ground at the subscriber's station in the usual manner, and through a switch on each of the boards and the polarized annunciator $b$ to ground, and that the operator at board 2 wishes to make a test to determine whether or not a connection has been made with the line either at board 1 or board 3. He makes this test by simply inserting test-plug $e$ into the spring-jack, as shown. When the tip of plug $e$ first touches the spring of the jack, current from battery $m$ is sent through annunciator $b$ to ground, thus closing the armature of polarized annunciator $b$ to ground-contact, and thus shunting out the resistance of the coils of the electro-magnet of annunciator $b$. This shunt around annunciator $b$ is closed as soon as the tip of plug $e$ touches the spring of the spring-jack, and before said spring is wedged away from its normal contact-point. The resistance of annunciator $b$ being thus removed from the circuit, battery $m$ will be closed momentarily through the low-resistance winding $g$ directly to ground, and armature $i$ will thus be separated from its normal contact $k$ and closed to contact $l$, as shown. The shunt around high-resistance winding $h$ is thus opened at $k$ and the local circuit through bell $n$ at the same time closed at $l$. Now, if the circuit of battery $m$ is closed through winding $g$ and winding $h$ to plug $e$, and thence to the spring of spring-jack in which the plug $e$ is inserted, and to line $a$ through the spring-jack of this line on the first board, the armature $i$ will still be attracted by the magnet and the local circuit will remain closed through bell $n$. Therefore, if bell $n$ rings the operator knows that the line is free.

In case the line is broken at the board following the one at which the test is being made, no circuit will be closed in the first instance when the test-plug is inserted and the armature $i$ will not be moved. On the other hand, if the line is open at the spring-jack of the line on board 1, as soon as the spring of the spring-jack in which the test-plug is inserted is wedged away from its normal contact the battery $m$ will find no circuit to line, since the line will be dead open at the preceding board.

It will be noted that by the use of my testing apparatus I test in two directions—first to ground at the central office and then over the line to the subscriber's station. I am thus enabled to determine whether the line is open on either side of the spring-jack at which the test is made. If the test indicates that the line is open on either side, the operator will know that the line is in use. If, however, he finds that the line is closed in both directions, he will know that the line is free.

Having thus described my invention, I claim as new and desire to secure by Letters Patent—

1. A telephone-line connected with a switch on each of two or more switch-boards and through a polarized annunciator to ground, in combination with a shunt around said polarized annunciator, which is closed when current is sent in one direction through the annunciator, and testing apparatus consisting of an electro-magnet having two windings, one of low resistance and the other of high resistance, a battery included in a normally-open ground-circuit with said electro-magnet, and switching apparatus whereby on closing said circuit to line at any switch of the line the shunt will be closed around the polarized annunciator, and thereupon the circuit of the testing apparatus is changed so as to include the high-resistance winding, substantially as described.

2. The combination, with a telephone-line passing through a series of spring-jacks, the spring-jack switches being distributed on different boards, of a polarized annunciator included in said line between the switch on the last board and the ground, a shunting device operated by the armature of said polarized annunciator to shunt out the coils immediately on said annunciator-magnet being energized, a ground-circuit including a battery and a doubly-wound electro-magnet of a signal device, said windings being of high and low resistance, respectively, a circuit-closing device actuated by the armature of said relay to bring the fine-wire coil into circuit on closing the battery through the coarse-wire coil directly to ground, and a plug terminal adapted to be inserted in any one of the spring-jack switches of the line, whereby on inserting the plug in any switch the line may be tested in both directions, substantially as specified.

3. A telephone-line passing through a series of spring-jack switches and through a polarized annunciator to ground, a shunt around said polarized annunciator, which is closed when current is sent in one direction through the annunciator, and testing apparatus consisting of a battery included in a ground-circuit with an electro-magnet having two windings, one of low resistance and the other of high resistance, and switching apparatus whereby on closing said circuit to any switch of the line the shunt will be closed around the polarized annunciator, and thereupon, the resistance of the coil of the polarized annunciator being removed from the circuit, the circuit of the testing apparatus will be changed to include the high-resistance winding, substantially as described.

4. The combination, with a telephone-line connected with a different spring-jack switch on different sections of a multiple switch-board, of a polarized annunciator and a shunting device connected by the armature thereof, and testing apparatus consisting of a battery and a doubly-wound electro-magnet, the different windings being of high and low resistance, respectively, a plug forming the terminal of said testing-apparatus circuit, whereby on applying the plug of the testing apparatus to any switch of the line a test may be made first through said polarized relay to determine whether the line is in use on the ground side of the switch at which the test is made, and on inserting the plug farther to lift the spring of the switch at which the line is being tested in the other direction, substantially as described.

In witness whereof I hereunto subscribe my name this 16th day of November, A. D. 1886.

CHARLES E. SCRIBNER.

Witnesses:
 GEORGE P. BARTON,
 WM. M. GILLER.